(12) United States Patent
Shan (10) Patent No.: US 9,829,964 B2
(45) Date of Patent: Nov. 28, 2017

(54) METHOD AND SYSTEM FOR LAUNCHING AN APPLICATION SATISFYING A CURRENT MODE DETERMINED BY LOOKING UP AN OPENING DIRECTORY FOR OPENING THE CURRENT MODE OF AN ELECTRONIC DEVICE

(71) Applicant: Lenovo (Beijing) Co., Ltd., Beijing (CN)

(72) Inventor: Liangqing Shan, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 99 days.

(21) Appl. No.: 14/755,852

(22) Filed: Jun. 30, 2015

(65) Prior Publication Data

US 2016/0224091 A1    Aug. 4, 2016

(30) Foreign Application Priority Data

Feb. 2, 2015    (CN) .......................... 2015 1 0052999

(51) Int. Cl.
*G06F 1/26* (2006.01)
*G06F 1/32* (2006.01)
*G06F 9/46* (2006.01)

(52) U.S. Cl.
CPC ............ *G06F 1/329* (2013.01); *G06F 1/3203* (2013.01); *G06F 9/46* (2013.01); *G06F 1/3234* (2013.01); *Y02B 60/144* (2013.01); *Y02B 60/32* (2013.01)

(58) Field of Classification Search
CPC .............................. G06F 1/3234; G06F 1/329
See application file for complete search history.

(56) References Cited

U.S. PATENT DOCUMENTS

| | | | | |
|---|---|---|---|---|
| 5,612,520 A | * | 3/1997 | Toedtman | G06F 1/1616 200/16 D |
| 6,710,705 B1 | * | 3/2004 | Smith | A01M 29/10 340/384.2 |

(Continued)

FOREIGN PATENT DOCUMENTS

| CN | 103324508 A | 9/2013 |
|---|---|---|
| CN | 103914342 A | 7/2014 |

OTHER PUBLICATIONS

First Chinese Office Action regarding Application No. 201510052999.9 dated Oct. 28, 2016. English translation provided by http://globaldossier.uspto.gov.

*Primary Examiner* — Xuxing Chen
(74) *Attorney, Agent, or Firm* — Harness, Dickey & Pierce, P.L.C.

(57) ABSTRACT

A control method and a control system are disclosed in the present disclosure, the application opening instruction is received, and the current power consumption mode of the electronic device is determined, and the application satisfying the current power consumption mode is opened based on the application opening instruction. In the present solution, applications having different power consumption are called based on the different power consumption modes of the electronic device, therefore, an application having high power consumption is called in a case that the application having high power consumption is required, and an application having low power consumption is called in a case that the application having low power consumption is required, to avoid energy waste and reduce power consumption due to the fact that the application having high power consumption is called in the case that the application having low power consumption is required.

10 Claims, 4 Drawing Sheets

(56) References Cited

U.S. PATENT DOCUMENTS

| | | |
|---|---|---|
| 7,426,647 B2 | 9/2008 | Fleck et al. |
| 2004/0225876 A1 | 11/2004 | Lam |
| 2007/0226722 A1 | 9/2007 | Chou |
| 2008/0059921 A1* | 3/2008 | Esliger .................. G06F 1/3203 716/136 |
| 2008/0104437 A1* | 5/2008 | Lee ....................... G06F 1/3203 713/323 |
| 2008/0189562 A1 | 8/2008 | McBrearty et al. |
| 2010/0064154 A1* | 3/2010 | King ................. H04W 52/0251 713/320 |
| 2015/0293575 A1* | 10/2015 | Hampson .............. G06F 1/3212 713/323 |

\* cited by examiner

METHOD AND SYSTEM FOR LAUNCHING AN APPLICATION SATISFYING A CURRENT MODE DETERMINED BY LOOKING UP AN OPENING DIRECTORY FOR OPENING THE CURRENT MODE OF AN ELECTRONIC DEVICE

The present application claims the priority to Chinese Patent Application No. 201510052999.9, entitled as "CONTROL METHOD AND CONTROL SYSTEM", filed on Feb. 2, 2015 with State Intellectual Property Office of PRC, which is incorporated herein by reference in its entirety.

FIELD

The present disclosure relates to the field of control, and in particular to a control method and a control system.

BACKGROUND

A multi-mode product refers to a control device which can provide multi-mode user interface, for example, a laptop computer, and specifically, the multiple modes may include an operating mode and an idle mode. The operating mode is mainly used by a user at working time, and the idle mode is mainly used by the user at entertainment time.

However, in the operating mode, more accurate software is required, which results in high software power consumption; at entertainment time, since the more accurate software is not required, it will results in that the power consumption is increased and energy source is wasted.

SUMMARY

The control method includes:
receiving an application opening instruction;
determining a current power consumption mode of an electronic device; and
opening an application satisfying the current power consumption mode based on the application opening instruction.

A control system includes a receiving unit, a first determining unit connected with the receiving unit and an opening unit connected with the first determining unit, wherein
the receiving unit is configured to receive an application opening instruction;
the first determining unit is configured to determine a current power consumption mode of an electronic device; and
the opening unit is configured to, based on the application opening instruction, open an application satisfying the current power consumption mode.

It can be seen from the above technical solution that, in the control method and the control system disclosed in the present disclosure, the application opening instruction is received, and the current power consumption mode of the electronic device is determined, and the application satisfying the current power consumption mode is opened based on the application opening instruction. In the present solution, applications having different power consumption are called based on the different power consumption modes of the electronic device, therefore, an application having high power consumption is called in a case that the application having high power consumption is required, and an application having low power consumption is called in a case that the application having low power consumption is required, to avoid energy waste and reduce power consumption due to the fact that the application having high power consumption is called in the case that the application having low power consumption is required.

BRIEF DESCRIPTION OF THE DRAWINGS

In order to more clearly illustrate the technical solution in the embodiments of the disclosure or in the prior art, in the following, accompanying drawings required in the description of the embodiments or the prior art will be introduced simply. Obviously, the accompanying drawings in the following description are just some embodiments of the disclosure. For those skilled in the art, other accompanying drawings can also be obtained according to the accompanying drawings provided without any creative work.

DETAILED DESCRIPTION OF THE EMBODIMENTS

Hereinafter, the technical solutions in the embodiments of the present disclosure will be described clearly and completely in conjunction with the drawings in the embodiments of the present disclosure. Obviously, the described embodiments are only some of the embodiments of the present disclosure, but not all the embodiments. All the other embodiments obtained by those skilled in the art based on the embodiments in the present disclosure without creative labor will fall within the scope of protection of the present disclosure.

Figure 1:
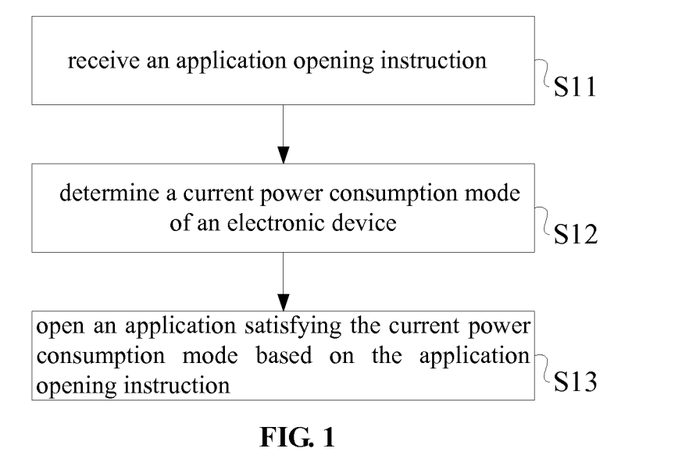
FIG. 1 is a flow diagram of a control method according to the embodiments of the present disclosure.

It is provided a control method in an embodiment of the present disclosure, a flow diagram of the control method is shown in FIG. 1, which includes step S11 to step S13.

In step S11, an application opening instruction is received.

When a user needs to use an application in an electronic device, the application is not opened immediately after an opening instruction is executed, and a current power consumption mode of the electronic device is determined at first after the application opening instruction is received, to avoid unnecessary energy loss since that an application having high power consumption is used in an idle mode.

In step S12, a current power consumption mode of the electronic device is determined.

The power consumption mode of the electronic device at least includes two modes, an operating mode and an idle mode, specifically, an application having high power consumption is called for office use in the operating mode, and an application having low power consumption is called for entertainment in the idle mode.

Opening paths for opening the operating mode or the idle mode of the electronic device are different. When it is determined the current power consumption mode of the electronic device, it is only required to look up the opening path for opening the current power consumption mode of the electronic device.

In addition, opening directories for opening the operating mode or the idle mode of the electronic device are different. When it is determined the current power consumption mode of the electronic device, it is only required to look up the opening directory for opening the current power consumption mode of the electronic device.

In step S13, an application satisfying the current power consumption mode is opened based on the application opening instruction.

An application having high power consumption of the application specified by the opening instruction is called in a case that the current power consumption of the electronic device is the operating mode, or an application having low power consumption of the application specified by the opening instruction is called in a case that the current power consumption of the electronic device is the idle mode.

In the control method disclosed by the embodiment, the application opening instruction is received, and the current power consumption mode of the electronic device is determined, and the application satisfying the current power consumption mode is opened based on the application opening instruction. In the present solution, applications having different power consumption are called based on the different power consumption modes of the electronic device, therefore, an application having high power consumption is called in a case that the application having high power consumption is required, and an application having low power consumption is called in a case that the application having low power consumption is required, to avoid energy waste and reduce power consumption due to the fact that the application having high power consumption is called in the case that the application having low power consumption is required.

Figure 2:
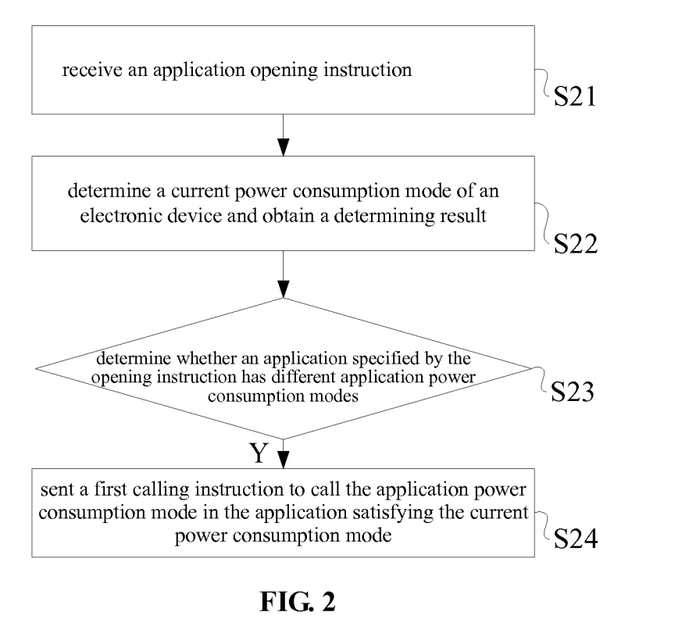
FIG. 2 is a flow diagram of a control method according to the embodiments of the present disclosure.

It is provided a control method in an embodiment of the present disclosure, a flow diagram of the control method is shown in FIG. 2, which includes step S21 to step S24.

In step S21, an application opening instruction is received.

In step S22, a current power consumption mode of the electronic device is determined, and a determining result is obtained.

In step S23, whether an application specified by the opening instruction has different application power consumption modes is determined.

The step of determining whether the specified application has different application power consumption modes means that it is determined whether the specified application has two power consumption modes for one application, it can be chosen from the settings whether a power consumption mode having high power consumption or a power consumption mode having low power consumption is required to be called by the application after the application is opened.

In step S24, in a case that it is determined that the application specified by the opening instruction has the different application power consumption modes, a first calling instruction is sent to call the application power consumption mode in the application satisfying the current power consumption mode.

No matter whether the power consumption mode having high power consumption or the power consumption mode having low power consumption is called by the application, the power consumption mode corresponds to the determining result in step S22, the power consumption mode having high power consumption in the application is called in a case that the current power consumption mode of the electronic device is the operating mode, and the power consumption mode having low power consumption in the application is called in a case that the current power consumption mode of the electronic device is the idle mode.

In the control method disclosed by the embodiment, the application opening instruction is received, and the current power consumption mode of the electronic device is determined, the determining result is obtained, the application power consumption mode satisfying the determining result in the application is called in a case that the application specified by the opening instruction has different application power consumption modes. In the present solution, application power consumption modes having different power consumption in the application are called based on the different power consumption modes of the electronic device, therefore, the application power consumption mode having high power consumption is called in a case that the application having high power consumption is required, and an application power consumption mode having low power consumption is called in a case that the application having low power consumption is required, to avoid energy waste and reduce power consumption due to the fact that the application power consumption mode having high power consumption is called in the case that the application having low power consumption is required.

Figure 3:
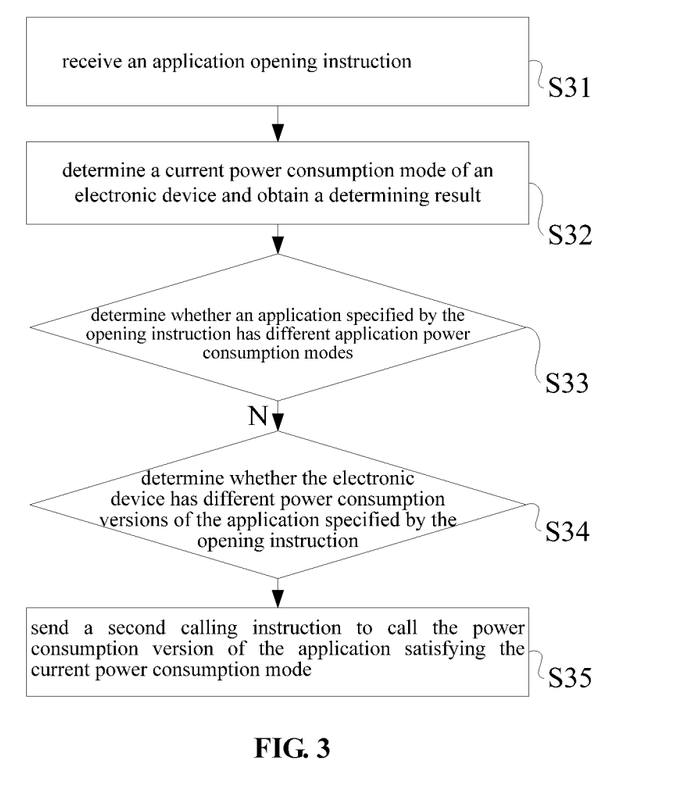
FIG. 3 is a flow diagram of a control method according to the embodiments of the present disclosure.

It is provided a control method in an embodiment of the present disclosure, a flow diagram of the control method is shown in FIG. 3, which includes step S31 to step S35.

In step S31, an application opening instruction is received.

In step S32, a current power consumption mode of the electronic device is determined, and a determining result is obtained.

In step S33, whether an application specified by the opening instruction has different application power consumption modes is determined.

The step of determining whether the specified application has the different application power consumption modes means that it is determined whether the specified application has two power consumption modes for one application, after the application is opened, it can be chosen from the settings whether a power consumption mode having high power consumption or a power consumption mode having low power consumption is called by the application.

In step S34, in a case that it is determined that an application specified by the opening instruction does not have the different application power consumption modes, whether the electronic device has different power consumption versions of the application specified by the opening instruction is determined.

In a case that the specified application does not have the low power consumption mode and the high power consumption mode, whether the electronic device has a low power consumption version of the application and a high power consumption version of the application is determined, that is, the electronic device has two different versions of the application, a low power consumption version and a high power consumption version.

In step S35, in a case that the electronic device has the low power consumption version of the application and the high power consumption version of the application, a second calling instruction is sent to call the power consumption version of the application satisfying the current power consumption mode.

In a case that the electronic device has two different power consumption versions of the specified application, the high power consumption version of the application is called in a case that the determining result is that the electronic device is in the operating mode, and the low power consumption version of the application is called in a case that the determining result is that the electronic device is in the idle mode, to avoid energy waste.

In the control method disclosed in the embodiment, the application opening instruction is received, and the current power consumption mode of the electronic device is determined, the determining result is obtained, in a case that the application specified by the opening instruction has different power consumption versions in the electronic device, the power consumption version of the application in the electronic device satisfying the determining result is called. In the present solution, different power consumption versions of the application in the electronic device are called based on the different power consumption modes of the electronic device, therefore, the high power consumption version of the application is called in a case that the application having high power consumption is required, and the low power consumption version of the application is called in a case that the application having low power consumption is required, to avoid energy waste and reduce power consumption due to the fact that the high power consumption version of the application is called in the case that the application having low power consumption is required.

Figure 4:
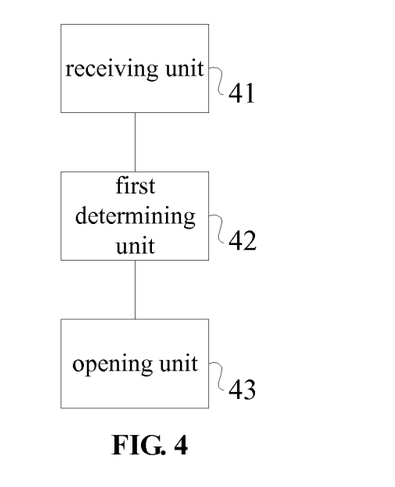
FIG. 4 is a schematic structural diagram of a control system according to the embodiments of the present disclosure.

It is provided a control system in an embodiment of the present disclosure, a schematic structural diagram of the control system is shown in FIG. 4, which includes a receiving unit 41, a first determining unit 42 connected with the receiving unit 41, an opening unit 43 connected with the first determining unit 42.

Specifically, the receiving unit 41 is configured to receive an application opening instruction.

When a user needs to use an application in an electronic device, the application is not opened immediately after the opening instruction is executed, and a current power consumption mode of the electronic device is determined at first after the application opening instruction is received, to avoid unnecessary energy loss since that an application having high power consumption is used in an idle mode.

The first determining unit 42 is configured to determine the current power consumption mode of the electronic device.

The power consumption mode of the electronic device at least includes two modes, an operating mode and an idle mode. Specifically, an application having high power consumption is called for office use in the operating mode, and an application having low power consumption is called for entertainment in the idle mode.

Opening paths for opening the operating mode or the idle mode of the electronic device are different. When it is needed to determine the current power consumption mode of electronic device, it is only required to look up the opening path for opening the current power consumption mode of the electronic device.

In addition, opening directories for opening the operating mode and the idle mode of the electronic device are different. When it is determined the current power consumption mode of the electronic device, it is only required to look up the opening directory for opening the current power consumption mode of the electronic device.

The opening unit 43 is configured to open an application satisfying the current power consumption mode based on the application opening instruction.

Figure 5:
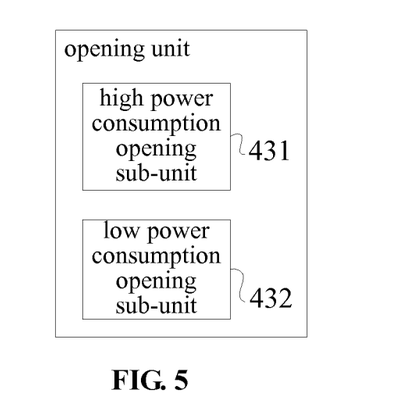
FIG. 5 is a schematic structural diagram of an opening unit in the control system according to the embodiments of the present disclosure.

Specifically, a schematic structural diagram of the opening unit 43 is shown in FIG. 5, which includes a high power consumption opening sub-unit 431.

The high power consumption opening sub-unit 431 is configured to call an application having high power consumption of the application specified by the opening instruction in a case that the current power consumption mode of the electronic device is the operating mode.

The opening unit 43 may further include a low power consumption opening sub-unit 432.

The low power consumption opening sub-unit 432 is configured to call an application having low power consumption of the application specified by the opening instruction in a case that the current power consumption mode of the electronic device is the idle mode.

In the control system disclosed by the embodiment, the receiving unit is configured to receive the application opening instruction, and the first determining unit is configured to determine the current power consumption mode of the electronic device, and the opening unit is configured to open the application satisfying the current power consumption mode based on the application opening instruction. In the present solution, applications having different power consumption are called based on the different power consumption modes of the electronic device, therefore, an application having high power consumption is called in a case that the application having high power consumption is required, and an application having low power consumption is called in a case that the application having low power consumption is required, to avoid energy waste and reduce power consumption due to the fact that the application having high power consumption is called in the case that the application having low power consumption is required.

Figure 6:
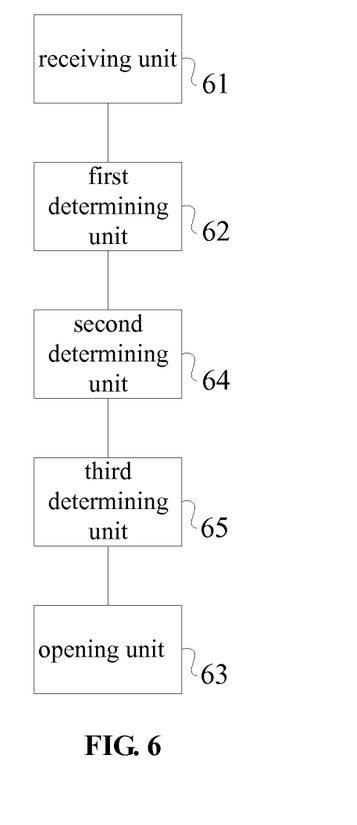
FIG. 6 is a schematic structural diagram of a control system according to the embodiments of the present disclosure.

A control system is disclosed in an embodiment of the present disclosure, a schematic structural diagram of the control system is shown in FIG. 6, which includes a receiving unit 61, a first determining unit 62 connected with the receiving unit 61, an opening unit 63 connected with the first determining unit 62, a second determining unit 64 connected with the first determining unit 62 and the opening unit 63.

In the embodiment, the second determining unit 64 is added to the structure in the above embodiment.

Specifically, after the first determining unit 62 determines the current power consumption mode of the electronic device and obtains the determining result, the second determining unit 64 is configured to determine whether the application specified by the opening instruction has different application power consumption modes, and obtain a second determining result.

In a case that the second determining result is that the application specified by the opening instruction has the different application power consumption modes, that is, it is determined that the specified application has two power consumption modes for the application, then it can be chosen from the settings whether a power consumption mode having high power consumption or a power consumption mode having low power consumption is required to be called by the application after the application is opened.

In a case that the second determining result is that the application specified by the opening instruction has the different application power consumption modes, the second determining unit 64 is configured to send a first calling instruction to the opening unit 63, to control the opening unit 63 to call the application power consumption mode satisfying the current power consumption mode in the application. No matter whether the power consumption mode having high power consumption or the power consumption mode having low power consumption is called by the application, the power consumption mode corresponds to the determining result from the first determining unit 62, that is, the power consumption mode having high power consumption in the application is called in a case that the current power consumption mode of the electronic device is the operating mode, and the power consumption mode having low power consumption in the application is called in a case that the current power consumption mode of the electronic device is the idle mode.

In the control system disclosed in the embodiment, the receiving unit is configured to receive the application opening instruction, and the first determining unit is configured to determine the current power consumption mode of the electronic device and obtain the determining result, the application power consumption mode satisfying the determining result in the application is called in a case that the application specified by the opening instruction has different application power consumption modes. In the present solution, application power consumption modes having different power consumption in the application are called based on the different power consumption modes of the electronic device, therefore, the application power consumption mode having high power consumption is called in a case that the application having high power consumption is required, and an application power consumption mode having low power consumption is called in a case that the application having low power consumption is required, to avoid energy waste and reduce power consumption due to the fact that the application power consumption mode having high power consumption is called in the case that the application having low power consumption is required.

Furthermore, a control system is disclosed in an embodiment of the present disclosure, which may further include a third determining unit 65 connected with the second determining unit 64 and the opening unit 63.

The third determining unit 65 is configured to determine whether the electronic device has different power consumption versions of the application specified by the opening instruction and obtain a third determining result in a case that the second determining result is that the application specified by the opening instruction does not have the different application power consumption modes, the third determining unit 65 is configured to send a second calling instruction to the opening unit 63 in a case that the third determining result is that the electronic device has the different power consumption versions of the application specified by the opening instruction, and control the opening unit 63 to call a power consumption version of the application satisfying the current power consumption mode.

It is determined whether the electronic device has low power consumption version of the application and high power consumption version of the application in a case that the specified application does not have the low power consumption mode and the high power consumption mode, that is, it is determined whether the electronic device has two different versions for the same application, a low power consumption version and a high power consumption version.

In a case that the electronic device has two different power consumption versions of the specified application, the high power consumption version of the application is called in a case that the determining result is that the current power consumption mode of the electronic device is the operating mode, and the low power consumption version of the application is called in a case that the determining result is that the current power consumption mode of the electronic device is the idle mode, and therefore, energy loss is avoided.

In the control system disclosed in the embodiment, the receiving unit is configured to receive the application opening instruction, and the first determining unit is configured to determine the current power consumption mode of the electronic device and obtain the determining result, the power consumption version of the application satisfying the determining result in the electronic device is called in a case that the application specified by the opening instruction has different power consumption versions in the electronic device. In the present solution, different power consumption versions of the application in the electronic device are called based on the different power consumption modes of the electronic device, therefore, the high power consumption version of the application is called in a case that the application having high power consumption is required, and the low power consumption version of the application is called in a case that the application having low power consumption is required, to avoid energy waste and reduce power consumption due to the fact that the high power consumption version of the application is called in the case that the application having low power consumption is required.

The embodiments of the present disclosure are described herein in a progressive manner, with the emphasis of each of the embodiments on the difference between it and the other embodiments; therefore, for the same or similar parts between the embodiments, one can refer to the other embodiments. For the devices disclosed in the embodiments, the description thereof is simple since they correspond to the methods disclosed in the embodiments, therefore, the related parts can refer to the description of the method parts.

It may be further known by professionals that units and steps of the algorithm in each example described in conjunction with the embodiments disclosed in the present disclosure can be realized by electronic hardware, computer software or a combination thereof, in order to clearly illustrate interchangeability of the hardware and the software, a composition and steps of each example have been described generally in the above specification based on functions. Whether the function is executed in a hardware way or in a software way depends on a particular application and a design constraint condition of the technical solution. The professionals can use different methods for each particular application to realize the described function, however, this is not considered to be beyond the scope of the disclosure.

The method or the step of the algorithm described in conjunction with the embodiments of the present disclosure may be embodied by hardware, a software module executed by a professor or a combination thereof. The software module may be stored in a (Random Access Memory) RAM, a memory, a (Random Only Memory) ROM, an electrically programmable ROM, electrically erasable programmable ROM, a register, a hard disk, a removable disk, Compact Disk Read Only Memory (CD-ROM), or any other kind of memory medium known by those skilled in the art.

The present disclosure can be realized or used by those skilled in the art based on the above description for the disclosed embodiments, multiple modifications on those embodiments is obvious to those skilled in the art, and the general principle defined in the present disclosure may be realized in other embodiments without departing from the spirit or scope of the present disclosure. Therefore, the disclosure is not limited to these embodiments described in the present disclosure, and conforms to the widest scope consistent with the principle and novel properties disclosed in the present disclosure.

The invention claimed is:

1. A control method, comprising:
   receiving an instruction input by a user to instruct an electronic device to enter an office mode or an entertainment mode;
   receiving an application opening instruction;
   determining a current mode of the electronic device; and
   opening an application satisfying the current mode based on the application opening instruction,
   wherein the determining the current mode of the electronic device comprises:
      determining whether the current mode of the electronic device is in the office mode or in the entertainment mode by looking up an opening directors for opening the current mode.

2. The control method according to claim 1, wherein after the determining the current mode of the electronic device, the control method further comprises:
   determining whether an application specified by the application opening instruction has different application power consumption modes; and
   sending, in a case that the application specified by the application opening instruction has the different application power consumption modes, a first calling instruction to call an application power consumption mode in the application satisfying the current mode.

3. The control method according to claim 1, wherein after the determining the current mode of the electronic device, the control method further comprises:
   determining whether an application specified by the application opening instruction has different application power consumption modes;
   determining, in a case that it is determined that the application specified by the application opening instruction does not have the different application power consumption modes, whether the electronic device has different power consumption versions of the application specified by the application opening instruction; and
   sending, in a case that the electronic device has the different power consumption versions of the application specified by the application opening instruction, a second calling instruction to call the power consumption version of the application satisfying the current mode.

4. The control method according to claim 1, wherein the opening the application satisfying the current mode based on the application opening instruction comprises:
   calling an application having high power consumption of the application specified by the application opening instruction in a case that the current mode is the office mode.

5. The control method according to claim 1, wherein the opening the application satisfying the current mode based on the application opening instruction comprises:
   calling an application having low power consumption of the application specified by the application opening instruction in a case that the current mode is the entertainment mode.

6. A control system, comprising:
   one or more processors; and
   a memory storing program instructions, that when executed by the one or more processors, configure the processors to:
      receive an instruction input by a user to instruct an electronic device to enter an office mode or an entertainment mode;
      receive an application opening instruction;
      determine a current mode of the electronic device; and
      open an application satisfying the current mode based on the application opening instruction,
      wherein the determining the current mode of the electronic device comprises:
         determining whether the current mode of the electronic device is in the office mode or in the entertainment mode by looking up an opening directory for opening the current mode.

7. The control system according to claim 6, the processors, after the determining the current mode of the electronic device, are further configured to:
   determine whether the application specified by the application opening instruction has different application power consumption modes, and obtain a second determining result; and
   send in a case that the second determining result is that the application specified by the application opening instruction has the different application power consumption modes, a first calling instruction to call an application power consumption mode in the application satisfying the current mode.

8. The control system according to claim 7, wherein the processors, after the determining the current mode of the electronic device are further configured to:
   determine in a case that the second determining result is that the application specified by the application opening instruction does not have the different application power consumption modes, whether the electronic device has different power consumption versions of the application specified by the application opening instruction, and obtain a third determining result; and
   send in a case that the third determining result is that the electronic device has the different power consumption versions of the application specified by the application opening instruction, a second calling instruction to call the power consumption version of the application satisfying the current mode.

9. The control system according to claim 6, wherein the processors, in the opening the application satisfying the current mode based on the application opening instruction, are further configured to:
   call in a case that the current mode is the office mode, an application having high power consumption of the application specified by the application opening instruction.

10. The control system according to claim 6, wherein the processors, in the opening the application satisfying the current mode based on the application opening instruction, are further configured to:
    call in a case that the current mode is the entertainment mode, an application having low power consumption of the application specified by the application opening instruction.

* * * * *